United States Patent

[11] 3,581,306

| [72] | Inventor | Clark E. Johnson, Jr. |
| --- | --- | --- |
| | | 60 Pinecroft Road, Weston, Mass. 02193 |
| [21] | Appl. No. | 848,534 |
| [22] | Filed | Aug. 8, 1969 |
| [45] | Patented | May 25, 1971 |
| | | Continuation-in-part of application Ser. No. 515,895, Dec. 23, 1965, now abandoned. |

[54] TRIGONOMETRIC ENCODER
10 Claims, 7 Drawing Figs.

[52] U.S. Cl. .................................................. 340/347, 250/233
[51] Int. Cl. .................................................. G08c 9/06
[50] Field of Search .................................................. 340/347, 357, 358; 250/232, 233, 237, 231

[56] References Cited
UNITED STATES PATENTS

| 3,364,360 | 1/1968 | Bredael et al. .................. | 250/233 |
| --- | --- | --- | --- |
| 3,412,256 | 11/1968 | Cronin ........................ | 250/233X |
| 3,453,441 | 7/1969 | Gantz et al. .................. | 250/233X |

*Primary Examiner*—Maynard R. Wilbur
*Assistant Examiner*—Charles D. Miller
*Attorney*—Parker, Carter and Markey

ABSTRACT: In a trigonometric encoder for providing a digital indication of a trigonometric function of the angle of rotation of a shaft. A rotatable disc, attached to the shaft, whose rotation is to be measured, has alternate lines of differing flux transmissive ability, which lines are parallel with each other and with the diameter of the disc. There are two sources of flux on one side on the disc and two detectors on the opposite side. Each of the detectors is aligned with its source of flux and is arranged to detect the number of times the lines interrupt the flux from the source during rotation of the disc. The number of detected interruptions along with the number of lines are utilized to provide a trigonometric indication of the angle of rotation of the disc.

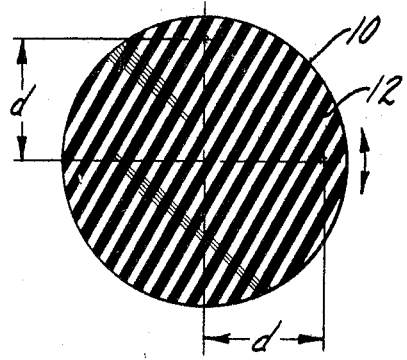
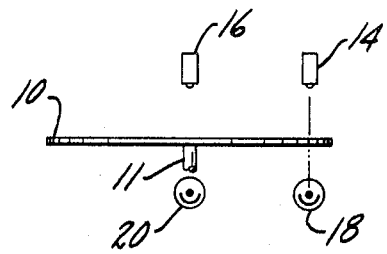
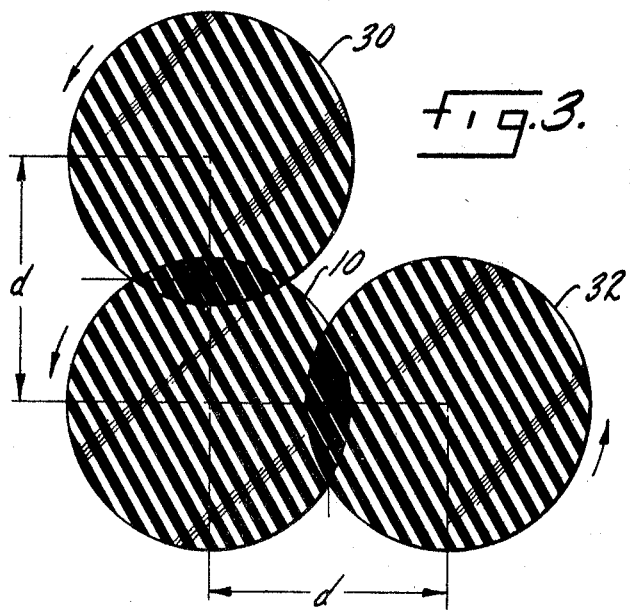
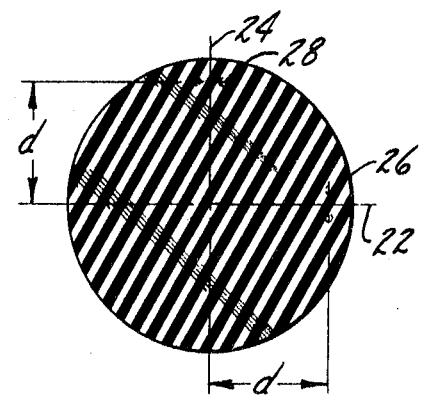
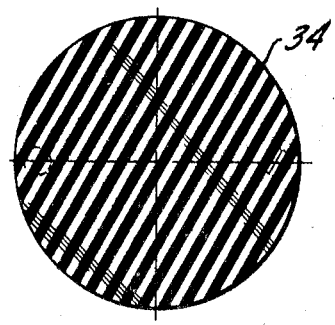
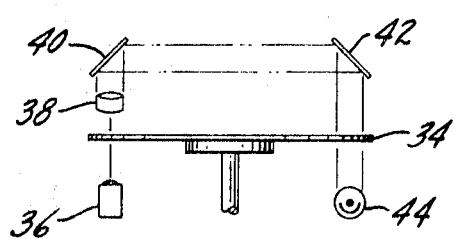
INVENTOR.
Clark E. Johnson, Jr.
BY Parker & Carter
Attorneys.

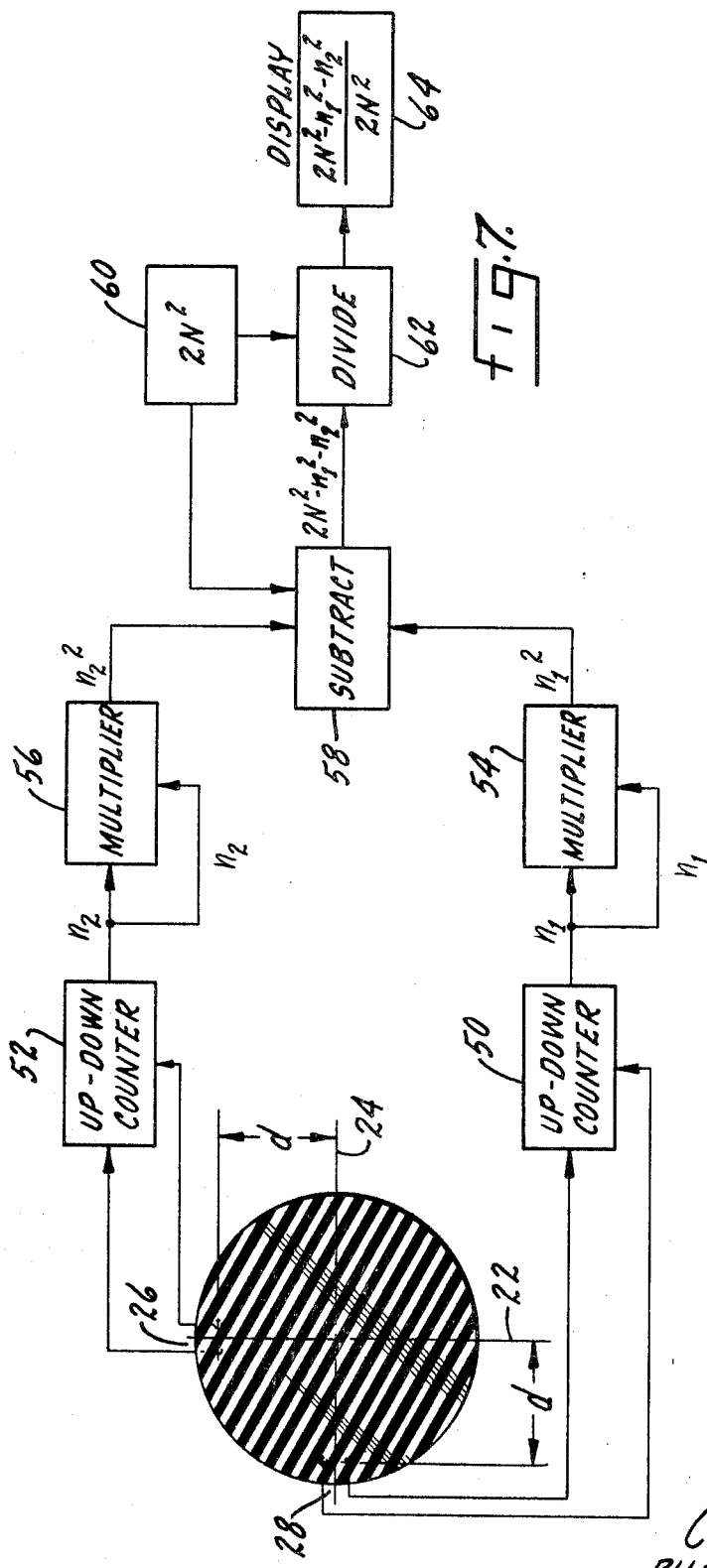

TRIGONOMETRIC ENCODER

This application is a continuation-in-part of copending application Ser. No. 515,895, filed Dec. 23, 1965 now abandoned.

SUMMARY OF THE INVENTION

This invention relates to a trigonometric encoder or resolver and particularly to a device of the type described which can provide a digital indication of a trigonometric function of the angle of rotation of a shaft or the like.

A primary purpose of the invention is a simply constructed and reliably operable trigonometric encoder of the type described having a minimum number of components.

Another purpose is a trigonometric encoder of the type described whose digital output may be fed directly to a computer or the like.

Another purpose is a trigonometric resolver whose output can be quickly utilized to find a trigonometric function of the angle of rotation.

Another purpose is a trigonometric encoder of the type described which may utilize either light flux or magnetic flux.

Another purpose is a resolver of the type described having a pair of output signals, which may be utilized in computing the angle of rotation of a rotatable member.

Other purposes will appear in the ensuing specification, drawings and claims.

BRIEF DESCRIPTION OF THE DRAWINGS

The invention is illustrated diagrammatically in the following drawings wherein:

FIG. 1 is a top plan view of one form of encoder,

FIG. 2 is a side elevation of the encoder illustrated in FIG. 1,

FIG. 3 is top plan view of a modified form of encoder,

FIG. 4 is a top plan view of a third form of encoder,

FIG. 5 is a side elevation of the encoder illustrated in FIG. 4,

FIG. 6 is a top plan view of yet a further form of encoder, and

FIG. 7 is an electrical diagram of the computing means.

DESCRIPTION OF THE PREFERRED EMBODIMENT

The invention is concerned with a device for measuring the angle of rotation of an object, for example a shaft. The shaft or other object will be attached to a disc, and the angle of rotation of the disc is what is actually measured. The invention will be described in connection with an optical system in which electromagnetic radiation, for example ordinary light, is directed through the disc to a photoelectric cell or similar detector. The disc may have lines or other opaque areas such that as the disc rotates the lines will interrupt the electromagnetic radiation, thus forming pulses in the detector. The invention also may be utilized in a magnetic system in which there are alternate areas having differing magnetic flux transmissive properties such that again there will be pulses formed in a detector as the flux from the source on one side of the disc is interrupted.

Turning to FIGS. 1 and 2, a disc 10 may be suitably attached to a rotating shaft 11 so that the angle of rotation of the shaft and the disc may be measured. The disc 10 may be formed of a transparent material, for example glass or any one of a number of suitable plastics. There are a plurality of generally equally spaced opaque lines 12 formed on the disc 10. The lines 12 are all equally spaced, one from another, and they are all parallel to a line through the axis of rotation of the disc 10, or to a diameter of the disc. It should be noted that the width of each line is preferably somewhat wider than the width of the space between lines. Such an arrangement gives a higher output with no DC level from light reaching the detector at all times. The number and spacing of the lines will vary with the required resolution.

Positioned on one side of the disc 10 are a pair of light sources 14 and 16, which are sufficiently small so that the point of light put out by each of the sources will only be interrupted by one line at a time. Generally it is preferred that the width of the lines be about the same as the diameter of the light beams. Positioned in alignment with the sources 14 and 16, and on the opposite side of the disc 10, are detectors 18 and 20, which may be conventional photoelectric cells.

The relative positions of the sources and detectors is important. Each of the detectors and the sources, which are in alignment therewith, may be positioned a distance $d$ from the axis of rotation of the disc 10. The distance $d$ may vary, although it is important that each of the sources and their associated detectors be positioned the same distance from the center. Also, it is important that the source 16 be angularly spaced 90° from the source 14, or in other words, that the sources 14 and 16 be on radii which are at right angles to each other.

With the arrangement illustrated in FIGS. 1 and 2, whenever disc 10 rotates, the light from each of the sources will be interrupted and pulses will be formed in the photoelectric cells 18 and 20. The number of pulses can be counted and can be utilized along with the number of lines 12 in computing trigonometric functions of the angle of rotation of the disc 10. For example, it has been determined that the cosine of the angle of rotation is equal to $2N^2-n_1^2-n_2^2/2N^2$ where $N$ is equal to the number of lines 12 on the disc 10 in the distance $d$, $n_1$ is equal to the number of pulses or counts at the other detector.

Both the starting point of disc rotation and the direction of rotation are arbitrary. A direction senser may be provided to indicate the direction of rotation. The invention should not be limited to determining any particular trigonometric function, as the sine and tangent of the angle of rotation can also be derived. Utilizing the above formula, a decimal based output is readily obtained. As an example let $2N^2=10^7$ or $N=2236$ lines in the distance $d$. Using such an arrangement, there is no division and the only operations required are a squaring and subtracting. In binary form, which is more acceptable to a computer, $N$ is made to be a power of 2. An encoder of approximately the same resolution as the decimal one described above would set $N$ as equal to $2^{11}$ or 2,048 lines. The $2N^2$ is equal to $2^{23}$. From this point on, the arithmetic is simple and the binary value for the cosine of the angle of rotation can be easily obtained.

In the arrangement illustrated in FIGS. 1 and 2, the angle of rotation is limited to plus or minus 90° as the cosine of 180° equals $-1$. However, utilizing the arrangement of FIG. 6, the angle of rotation can be increased to 360°.

In FIG. 6, radii 22 and 24 are at right angles to each other. In this case there are a pair of detectors and associated light sources a distance $d$ along each of the radii. The detectors are positioned on opposite sides of the radii 22 and 24, as indicated at 26 and 28. In such an arrangement, the detectors on opposite sides of the radii are closely spaced to the radii, but they are positioned on opposite sides so that one of the detectors will always count first, depending upon which direction the disc rotates. In this way, the disc or shaft is given a directional component or sign. The two counters associated with each radii are normally positioned close enough together so that the number of lines that pass each counter will not differ by more than one, but nevertheless one of the counters will always start to count first, thus giving an indication of the direction of rotation. Somewhat the same result can be obtained by having each detector of the pair on the same diameter, but at slightly differing distances from the center.

Turning now to that form of the invention illustrated in FIG. 3, the disc 10 is identical to the disc 10 illustrated in FIGS. 1 and 2. In this case, however, there are a pair of idler discs 30 and 32, which may be geared in any suitable manner to the disc 10 so that they rotate with the disc 10 and in the directions illustrated by the arrows. The lines on the discs 30 and 32 are identical to and parallel with the lines on the disc 10. The discs 30 and 32 have their axes of rotation arranged so that lines drawn through the axes of rotation of all three discs would describe an Isosceles right triangle. The axes of rotation of discs 30 and 32 are spaced a distance $d$ from the axis of rotation of disc 10. The discs will rotate so that the lines on each of the discs are always parallel to each other.

The detectors and their associated light sources are the same as illustrated in FIGS. 1 and 2. The advantage of the construction of FIG. 3 is that there is additional shuttering or interrupting of the light source as the discs rotate because of the overlapping arrangement. In high resolution encoders, as the number of lines on the discs increases, the light apertures become smaller and it is difficult to maintain the appropriate relative sizes of the light source and line thickness. Accordingly, using the additional shuttering or additional interruption of light as in the form shown in FIG. 3, the lines do not have to be reduced in thickness and there still will be sufficient shuttering or interruption to provide the high count necessary for a high resolution or high accuracy encoder.

It is not necessary that the discs be the same diameter or have their axes located at the same distance from the axis of disc 10. Different spacings would merely change the total number of shutterings or interruptions per revolution. The discs, however, must rotate at precisely the same angular velocity and have exactly the same line spacing. In the form shown in FIG. 3, $N$ is equal to the number of lines per inch times the distance between both idler discs. This will usually be about twice the value of $N$ for the arrangement of FIGS. 1 and 2.

Turning to the form illustrated in FIGS. 4 and 5, a disc 34 may be the same as the disc 10 in FIGS. 1 and 2. Only a single light source and its associated detector has been illustrated in FIGS. 4 and 5, but it should be understood that the relative position of the light sources and their detectors will be the same as illustrated in FIGS. 1 and 2. Again there will be two combinations of two sources and detectors as this is necessary for complete operation of the invention. A light source 36 may be positioned on one side of the disc 34 and its light may pass through the disc to an image forming lens 38. The lens 38 will direct the light pattern, which in this case will be a lighted area broken by lines, onto a reflective surface or mirror 40. The mirror 40 is positioned to direct the light pattern down again to the disc 34 and to a photoelectric cell 44. The advantage of the arrangement illustrated in FIGS. 4 and 5 is that again there is additional shuttering or interruptions, without decreasing the spacing between or the width of the lines. Again there will be two detectors and associated sources which are in effect located at right angles to each other as this is necessary for operation of the invention. However, in this case the image of one side of the disc is projected over onto the other side of the disc to provide additional light interruptions and hence a higher count for a given angle of rotation. $N$ will be twice as large as the arrangement shown in FIGS. 1 and 2.

FIG. 7 illustrates counting means for utilizing the disc arrangement of FIG. 6. The detectors 28 are connected to an up-down counter 50 and the detectors 26 are connected to an up-down counter 52. Such counters are conventional in the art. The output from counter 50, $n_1$, is fed to a multiplier 54, there being two $n_1$ inputs to the multiplier 54 with the resultant output being $N_1^2$. In like manner, two outputs from counter 52 are fed to multiplier 56 with the output being $n_2^2$.

Subtracting means 58 receives the two inputs $n_1^2$ and $n_2^2$ and in addition a preset count equal to $2N^2$ from a source 60. The output from subtracting means 58 is equal to $2n^2-n_1^2-n_2^2$ and is fed to a divide circuit 62. The divide circuit 62 also receives an output from the preset source 60 of $2N^2$. The output from the divide circuit 62 is fed to a display 64 which will thus provide a numerical indication of the cosine of the angle of rotation of the disc.

The above-described computing means is merely illustrative of one electrical arrangement which can be used to provide an indication of disc rotation through the use of pulses derived by the detectors 26 and 28.

As mentioned above, the invention should not be limited to an optical system as it is equally satisfactory to provide a magnetic arrangement in which there may be alternate areas of differing magnetic flux transmissive characteristics. Neither should the invention be limited to a normal light source, as any type of electromagnetic radiation may be satisfactory, although light is the simplest and most inexpensive to use.

I have not shown herein the mathematical operations which are necessary to provide the formula illustrated above. However, the mathematical operations are not so complex that they cannot be derived with a minimum amount of effort by utilizing the drawing and the principles set forth herein. Whereas the preferred form of the invention has been shown and described herein, it should be realized that there are many modifications, substitutions and alterations thereto within the scope of the following claims.

I claim:

1. In a means for translating angular rotation into a digital value, a rotatable disc, said disc having a given number of alternate lines of constant width and of differing flux transmissive ability, with said alternate lines being parallel with each other and parallel with a diameter of said disc, a first source of flux on one side of said disc and a first detector on the opposite side of said disc in alignment with said first source, with said first detector being arranged to detect the number of times the flux from the first source is interrupted by said alternate lines during rotation of said disc, a second source of flux on one side of said disc and spaced the same distance from the center of said disc as said first source, said second source being angularly displaced a predetermined distance from said first source, and a second detector on the opposite side of the disc from said second source and aligned therewith, said second detector being arranged to detect the number of times the flux from the second source is interrupted by said lines during rotation of said disc, and means for using the number of interruptions detected by said first and second detectors and the number of alternate lines to provide an indication of the angle of rotation of said disc.

2. The structure of claim 1 further characterized in that said second source is angularly displaced 90° from said first source.

3. The structure of claim 1 further characterized in that said alternate lines have differing light flux transmissive ability, with each of said sources providing light flux.

4. The structure of claim 3 further characterized in that said alternate lines are provided by opaque lines on said disc.

5. The structure of claim 4 further characterized in that each of said sources includes a reflecting surface on the opposite side of said disc from its aligned detector, a light source on the same side of the disc as the detector and diammetrically positioned therefrom, and a second reflecting surface positioned on the same side of the disc as the first-named reflecting surface and positioned to reflect light from the source to the first-named reflecting surface.

6. The structure of claim 4 further characterized in that each of said detectors includes a pair of photoelectric cells, with each photoelectric cell in a pair being positioned on either side of a line drawn through the axis of rotation of said disc and generally equally between the photoelectric cells of said pair.

7. The structure of claim 4 further characterized by and including a pair of idler discs having alternate lines identical with said first-named disc and arranged for rotation in the same direction as said first-named disc at the areas of said light sources and detectors, and with the alternate lines on said idler discs being parallel to the alternate lines on said first-named disc.

8. The structure of claim 7 further characterized in that said idler discs are angularly displaced 90° apart, with the axes of rotation of said idler discs being spaced the same distance from the axis of rotation of said first-named disc.

9. The structure of claim 1 further characterized in that the cosine of the angle of rotation of said disc is determined by the formula $2N^2-{}_1^2-n_2^2/2N^2$ where $N$ equals the number of lines on said disc in a given distance, $n_1$ equals the number of interruptions detected at one detector and $n_2$ equals the number of interruptions detected at the second detector.

10. The structure of claim further characterized in that the means for using the number of interruptions detected at said first and second detectors and the number of alternate lines provides digital indication of a trigonometric function of the angle of rotation of said disc.